United States Patent [19]
Saunders et al.

[11] 3,825,295
[45] July 23, 1974

[54] TRUCK CAB LATCH

[75] Inventors: James W. Saunders, Milpitas; Donald L. Stephens, Los Gatos, both of Calif.

[73] Assignee: Paccar Inc., Bellevue, Wash.

[22] Filed: Apr. 3, 1972

[21] Appl. No.: 240,537

[52] U.S. Cl............... 296/35 R, 180/89 A, 292/110
[51] Int. Cl............................................. B62d 27/06
[58] Field of Search....... 296/28 C, 35 R; 180/89 A; 292/110, 201

[56] References Cited
UNITED STATES PATENTS

| | | | |
|---|---|---|---|
| 2,749,175 | 6/1956 | King et al. | 298/38 |
| 2,943,693 | 7/1960 | Norrie | 180/89 A |
| 3,497,257 | 2/1970 | Hirst | 180/89 A |
| 3,581,840 | 7/1971 | Hirst | 296/35 R |

FOREIGN PATENTS OR APPLICATIONS

| | | | |
|---|---|---|---|
| 1,439,918 | 4/1966 | France | 180/89 A |

*Primary Examiner*—Kenneth H. Betts
*Assistant Examiner*—John A. Pekar

[57] ABSTRACT

A latch mechanism for use upon a cab over engine truck which is adapted to be unlatched upon introduction of fluid under pressure to the cylinders which raise the cab and yet is designed to latch and remain secure under pulling, twisting or application of pressure different from the sequence predetermined to unlatch. The latch is adapted to withstand great pressure without damage to the structure. The hook of the mechanism is spring biased towards the latched condition, during the unlatching operation the bias is overridden, and the mechanism permits reliable latching with a short operating stroke.

5 Claims, 3 Drawing Figures

PATENTED JUL 23 1974　　　　　3,825,295

TRUCK CAB LATCH

BACKGROUND OF THE INVENTION

Cab over engines are well known in the art and the relative advantages of this type of a structure for a truck are likewise well known in the art. One of the problems with a cab over engine vehicle is in the inherent weight in the cab structure which must be moved to allow access to the engine and its component parts. To alleviate the problem of moving the large mass, various devices have been designed to either lift the weight or counterbalance it. One method which is well known in the art for handling cab over engine type vehicles is through the use of a hydraulic system including rams to lift the cab. The hydraulic system may be used to lift the cab from its down or driving position to its up or engine exposed position or vice versa.

Of importance to the vehicle operator is the necessity that the cab be secured in the lower or driving position when moving along the highway since any movement of the cab during this state of operation might be disasterous. Since the cab and frame structure are continuously subjected to twisting stress, the use of a normal latch is ill advised. The latch must be tolerant of some mismatching and yet remain secure at all times.

One of the problems with the prior art latches, many of which are hydraulically operated, is not just in the operation of the latch by the hydraulic pressure but the lack of security and operativeness of the latch following a twisting stress placed upon the cab or frame or excessive stresses tending to pivot the cab around its pivot point, normally adjacent the front bumper.

Attempts have been made to provide a latch mechanism which is operable by the hydraulic circuit thereby eliminating a fair amount of operator time and energy. These prior art devices have the disadvantage of either requiring too much space because of the long throw necessary to assure a secure latch or alternatively not being of a type which is sufficiently secure when the frame or cab are subjected to unusual stress.

With the above noted problems in mind it is an object of the present invention to provide a latch mechanism for a cab wherein the latch is operable by the hydraulic circuit, which in turn operates the lift cylinders for the cab and yet is of a design which is secure even under twisting or pivoting stresses of the cab or frame.

With the above objects in mind it is a feature of the present invention to provide a hydraulically operable latch which is spring biased towards the closed position and in which unusual stresses upon the latch mechanism may result in operation of the biasing spring but not a disengagement of the latch nor damage to the latch.

Another object of the present invention is to provide a latch mechanism wherein the latch motion includes a movement of the hook away from the pin during disengagement to relieve any loads caused by stresses and then a motion to one side to allow movement by the hook to clear the pin during opening of the engine compartment.

Yet another object of the present invention is to provide a latch mechanism which is hydraulically opened and adapted to have the hook move quickly to engage the latch pin as the first part of its closing motion and then move upwardly to lock the pin in position upon further relief of hydraulic pressure.

DETAILED DESCRIPTION OF THE DRAWINGS

Figure 1:
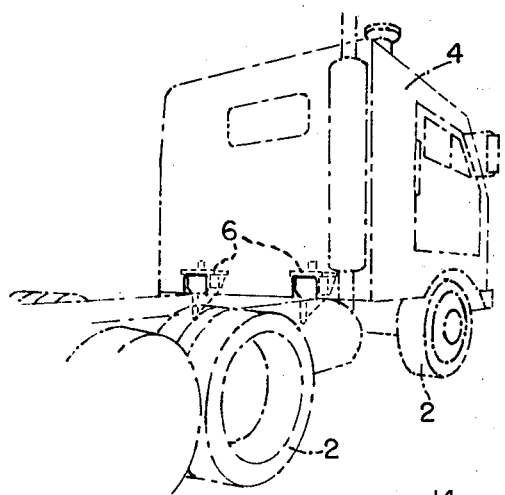
FIG. 1 is a schematic environmental view showing a typical cab over engine vehicle and one possible location and arrangement of the latch mechanism.

As seen in FIG. 1 the cab over engine type vehicle comprises a basic frame, load contacting wheels 2, the cab 4 and a latch mechanism 6 as to be described in greater detail hereinafter. It is to be noted that the latch mechanism although shown and described with the actual latch mechanisms on the cab and the latch pins secured to the frame it could equally well be mounted in the inverse position, i.e., with the latch pins on the lower portion of the rear of the cab and the latch mechanisms secured to the frame. It is to be understood that although the preferred embodiment uses a pair of mechanisms in opposed relationship, the same structure could be used as a single unit.

Figure 2:
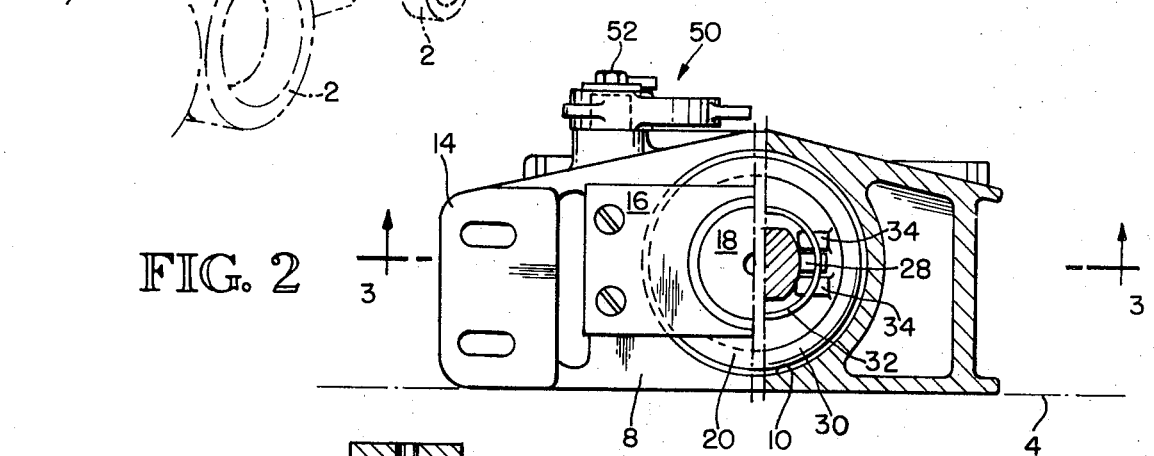
FIG. 2 is a plan view of the inventive latch mechanism partially in section showing the mechanism for disengaging the latch.
Figure 3:
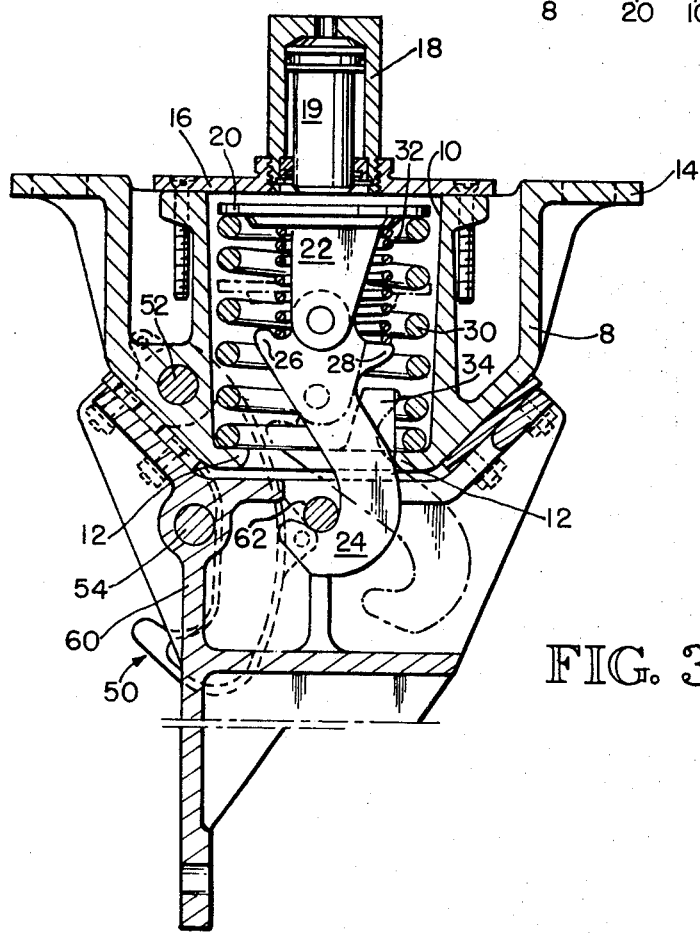
FIG. 3 is a sectional view of the inventive latch structure along line 3—3 of FIG. 2.

Referring now to FIGS. 2 and 3 in combination it can be seen that the latch mechanism includes a main housing 8 having a central bore 10 completely open at the upper portion and terminating in inwardly projecting lips 12 at the lower portion. The upper portion of the housing 8, as shown in FIG. 3, includes outwardly extending flanges 14 having holes therethrough for attachment to the vehicle.

The top part of the bore 10 is partially closed by a plate 16 which is appropriately secured to the housing by screws or the like. Plate 16 serves as a mounting plate for the fluid operated cylinder 18 having a ram 19 which extends through the plate 16 when extended for purposes to be hereinafter described.

Mounted within the bore 10 is a generally circular plate 20 placed at the upper portion of the bore and abutting relationship with the opening for the ram of hydraulic cylinder 18. A pair of trunnion supports 22 extend from the side of the plate 20 opposite to that abutting the hydraulic ram and have pivotally secured thereto a latch hook 24 including outwardly projecting ears 26 and 28. Ears 26 and 28 lie in a plane perpendicular to the plane of the axis of pivot of latch hook 24.

Mounted between the plate 20 and the lip 12 of the housing 8 is a heavy duty compressing spring 30 continuously urging the plate 20 against the plate 16. Mounted between the plate 20 and the ears 26, 28 is a lighter duty spring 32 having its axis of rotation set off center from the axis of movement of the hook 24 about the trunnion set in supports 22. Mounted within the housing 8 and extending upwardly from the lower lip portion are a pair of stops 34 which are positioned to straddle the ear 28 for purposes to be hereinafter described.

Pivotally mounted to the exterior of the housing 8, for manual movement when necessary, is a safety latch 50 mounted for motion about an axis 52 and adapted to engage a latch pin 54 secured to the frame. The purpose for the safety latch 50 is such that if the main latch should accidently disengage the cab will not open but will move only upwardly until the latch 50 engages the latch pin 54 whereat it will be secure until intentionally released.

The frame of the vehicle in the area adjacent the latch mechanism includes a bracket 60 which is securely mounted and is configured to complement the latch mechanism. The bracket 60 includes a general depression having a hole therethrough so that the latch hook 24 may extend therethrough and includes a latch pin 62 for engagement by the latch hook 24. Of course the bracket 60 may well include rubber bumpers or insulation pads.

In operation, when it is desired to open the engine compartment the cylinder 18 is actuated causing piston 19 to move downwardly contacting plate 20 and moving it downwardly compressing spring 30 until the lower coils of spring 32 contact the stops 34. The compression of one side of spring 32 causes decreased pressure upon the side 28 moving the hook 24 in a direction toward the right as seen in phantom in FIG. 3. It is to be understood that the compression of spring 30 has first allowed the hook to move downwardly from latch pin 60 so that the hook may clear the pin.

When the latch pin is subjected to stress, the latch hook 24 remains engaged with the pin 62 and the spring 30 compresses. If sufficient stress is present, spring 32 will contact stops 34 and be lifted from ear 28. However, since the latch hook 24 has not initially moved away from pin 62 it will remain engaged preventing an unexpected opening of the engine compartment.

As noted above the latch is actuated by the same hydraulic system as operates the lift mechanism, although this is not a necessary part of the invention, and once this is the case the latch is released and the cab will be elevated exposing the engine compartment. It is understood that during this process the operator will disengage the safety latch 50. When the truck is again put in its closed position, i.e., the engine compartment closed the hydraulic pressure will be released and as the spring 30 expands it in turn will release the pressure upon the right hand portion of the spring 32 letting the hook first move to the left as seen in FIG. 3 and so engage pin 62 as it moves inwardly and finally upwardly until it is completely locked.

Thus it can be seen that the present invention provides a compact automatically operable latch mechanism which is inherently biased toward the latched position and is constructed to permit some variation in alinement without affecting its operative characteristics.

The embodiments of the invention in which an exclusive property or privilege is claimed are defined as follows:

1. A latch mechanism for use upon a cab over engine truck and mounted to the rear portion of the cab and the adjacent framework comprising;
    a latch pin horizontally mounted to either the frame or the cab of the truck,
    a fluid operated latch mounted to interact with the latch pin when the cab is in the lowered position, said latch comprising a hollow housing having an opening through its lower surface and an inwardly extending lip surrounding the opening, a ram mounted to the top of the housing having its push rod extendable through the housing toward the opening, a latch mounting plate having trunnion supports extending from one face thereof and the other face abutting the upper surface of the housing beneath the ram, a heavy duty compression spring mounted between the mounting plate and the lip continuously urging the plate against the top of the housing, a latch hook pivotally mounted to the trunnion supports having a lower portion to engage the latch pin and a pair of opposed ears extending at approximately right angles to the latch pin and a second compression spring mounted between the ears of the latch and the mounting plate, said spring being mounted offset from the axis of movement of the latch providing a moment about the axis urging the latch to its closed position, and
    stop means secured to the housing to contact the offset spring and move the latch to an open position when the ram is actuated thus enabling the cab to be opened.

2. A latch mechanism as in claim 1 and further including a manually operable safety latch.

3. A latch mechanism as in claim 1 wherein one extending latch hook ear is curved upwardly to capture the spring even when the latch is in open position.

4. A latch mechanism adapted to secure two relatively movable bodies in proximate relation comprising;
    a first portion secured to one body and having a relatively fixed latch pin,
    a second portion secured to the other body and including a pivotally mounted latch hook movable from a latched to an unlatched position,
    means for actuating the latch hook comprising relatively heavy duty first biasing means continuously urging the latch hook along a relatively vertical path to a latched position, fluid operated means selectively urging the latch hook to an unlatched position, a second biasing means mounted to continuously urge the hook transversely toward the latch position and means positioned to override the first biasing means whereby the latch hook will be moved linearly along a vertical path away from the pin and then pivoted causing transverse movement so the hook will clear the pin and allow the bodies to move away from from each other, both the first biasing means and the second biasing means extensible by relative movement of the two bodies when the latch pin and the latch hook are in a latched position without damage to the mechanism, said second portion including substantial reach, thereby allowing the heavy duty biasing means to operate through its stroke in the latched condition without causing damage or unlatching.

5. A latch mechanism as in claim 4 wherein the first biasing means is a coil spring having its axis pass through the axis of pivot of the latch hook and the second biasing means is a compression spring of lighter duty than the first biasing means and is mounted with its axis offset from the axis of pivot of the latch hook generating a greater force pivoting the latch hook to the latched position.

* * * * *